United States Patent
Hars

(10) Patent No.: US 7,295,674 B2
(45) Date of Patent: *Nov. 13, 2007

(54) ON-LINE RANDOMNESS TEST FOR DETECTING IRREGULAR PATTERN

(75) Inventor: Laszlo Hars, Cortlandt Manor, NY (US)

(73) Assignee: NXP B.V., Eindhoven (NL)

( * ) Notice: Subject to any disclaimer, the term of this patent is extended or adjusted under 35 U.S.C. 154(b) by 966 days.

This patent is subject to a terminal disclaimer.

(21) Appl. No.: 10/081,908

(22) Filed: Feb. 21, 2002

(65) Prior Publication Data

US 2003/0156713 A1 Aug. 21, 2003

(51) Int. Cl.
*H04L 9/00* (2006.01)
*G06F 19/00* (2006.01)
(52) U.S. Cl. .......................... 380/286; 463/22
(58) Field of Classification Search ............... 463/22; 380/28
See application file for complete search history.

(56) References Cited

U.S. PATENT DOCUMENTS 5,675,649 A * 10/1997 Brennan et al. ............ 380/286
5,873,781 A * 2/1999 Keane ......................... 463/22

OTHER PUBLICATIONS

Werner Schindler, "Efficient Online Tests for True Random Number Generators", Cryptographic Hardware and Embedded Systems, vol. 2162, May 14, 2001, pp. 103-117.
National Institute of Standards and Technology, "Random Number Generation and Testing", Internet, Dec. 18, 2000, pp. 1-2.

* cited by examiner

*Primary Examiner*—Nasser Moazzami
*Assistant Examiner*—Pramila Parthasarathy

(57) ABSTRACT

The present invention is a method and apparatus for testing random numbers generated by a random number generator in real time. As a series of random numbers are generated, a number of bits that have the value of a predetermined logic value at a specific, predefined range of intervals is determined and then applied to an exponential averaging operation (A). Thereafter, it is determined whether the generated random numbers are predictable by comparing the output of all said exponential operations to their predetermined acceptance range.

21 Claims, 3 Drawing Sheets

US 7,295,674 B2

ON-LINE RANDOMNESS TEST FOR DETECTING IRREGULAR PATTERN

FIELD OF THE INVENTION

The present invention pertains to the field of random number generators and, in particular, to a digital data processing apparatus and method for analyzing the statistical quality of the random numbers generated in real time.

BACKGROUND OF THE RELATED ART

Random numbers are used for various applications in many electronics systems. In encryption application, random number generators are used in some forms of cryptography to provide secure transmission of messages, such that only an intended receiving end can understand the message (i.e., voice or data) transmitted by an authorized transmitting end. However, as unauthorized receivers and unauthorized transmitters become more sophisticated in breaking the generation process of the random numbers that are used in encryption of messages, the need becomes greater for generating unpredictable random numbers for secured communications.

In addition to the security breach caused by unauthorized parties, the random number generator may generate non-random numbers during operation. Heat is typically generated in the hardware component of the random number generator when it generates a series of 1's and 0's over a time period. For example, generating a 1 bit could consume more power than a 0 bit. If a long sequence of 1 bits is generated, the electrical circuit becomes hot. If the circuit generates a 1 bit if it is hot, the circuit will "latch up" and generates only 1 bits. A different effect may occur if a 0 bit is generated when the circuit is hot. In this case a long sub-sequence of 1 bits becomes too rare, which constitute a non-random property. In cryptographic application any of these non-randomness may have catastrophic consequences: the security will be breached.

Accordingly, both the detection of hardware tampering and a component failure are necessary when conducting randomness tests. Conventional randomness tests are performed through extensive statistical testing, such as chi-squared tests, delta tests, and the like, on a sequence of generated random numbers. However, such tests are very expensive to be performed in real time as they require a great amount of computational processing power.

SUMMARY OF THE INVENTION

The present invention overcomes the above-described problems, and provides additional advantages, by providing a method and apparatus for providing an on-line randomness test so that the generated random numbers are sufficiently random.

According to one aspect of the invention, a method of evaluating the random numbers generated by a random number generator is provided. The method includes the steps of: generating a stream of random numbers; determining a number of bits that have a value of a predetermined logic value at a specific, predefined range of intervals; applying the number of bits indicative of the predetermined logic value to an exponential averaging operation (A); and, determining whether the generated random numbers are sufficiently random by comparing the output of all exponential averaging operations to a predetermined acceptance range. If the output of all of the exponential averaging operations (A) fall between the predetermined acceptance range, it is determined that the generated random numbers are sufficiently random (unpredictable). The exponential averaging operations (A) are updated each time a new bit is generated. The method further includes the step of notifying that the generated random sequence is not sufficiently random when the output of any of the exponential averaging operations (A) falls outside the predetermined acceptance range, and generating a new set of random sequences when this event occurs.

According to another aspect of the invention, a method of evaluating the random numbers generated by a random number generator includes the steps of: (a) generating a stream of random bits using the random number generator; (b) determining a number of bits that have a value of a predetermined logic value at a specific, predefined range of intervals; (c) performing an exponential averaging operation (A) on the number of bits indicative of the predetermined logic value; (d) comparing the output of the exponential averaging operation (A) to a predetermined acceptance range; and, (e) determining that the generated random numbers are not sufficiently random when any of the computed exponential averaging operations (A) falls outside the predetermined acceptance range. The method further includes the steps of: repeating the steps (a)-(d) until any one of the computed exponential averaging operations (A) falls outside the predetermined acceptance range, and notifying that not sufficiently random numbers are generated when the test under step (e) fails repeatedly more than a threshold value. A new set of random numbers is generated when the test under step (e) fails repeatedly more than a predetermined number of times.

According to a further aspect of the invention, an apparatus for evaluating the random numbers generated by a random number generator is provided. The apparatus includes a random generator unit for generating substantially random sequences; a detector unit, coupled to the output of the random generator unit, for detecting whether the generated random sequences are sufficiently random; and, a switching unit, coupled to the output of the random generator and the detector unit, for enabling the flow of the generated random sequences for a subsequent application when the generated random sequences are determined to be sufficiently random, wherein a number of bits that have a value of a predetermined logic value at a specific, predefined range of intervals is determined and applied to a plurality of exponential averaging operations (A) and wherein, if the output of any of the exponential averaging operations (A) falls outside a predetermined acceptance range, determining that the generated random sequences are not sufficiently random. The apparatus further comprising means for transmitting an alarm signal when the output of any of the exponential averaging operations (A) falls outside the predetermined acceptance range.

These and other advantages will become apparent to those skilled in this art upon reading the following detailed description in conjunction with the accompanying drawings.

DETAILED DESCRIPTION OF THE EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Figure 1:
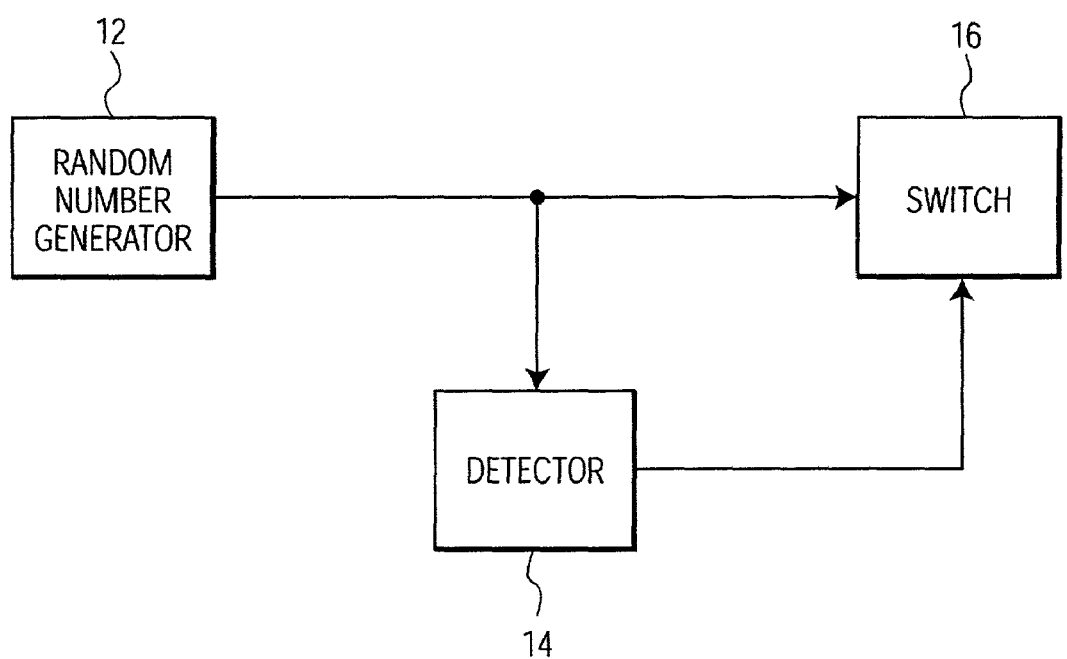
FIG. 1 illustrates a simplified block diagram of the random generating module according to an embodiment of the present invention.

FIG. 1 shows a block diagram of a system 10 capable of testing the statistics of the generated random numbers in real time according to an exemplary embodiment of the present invention. The system 10 incorporates a random number generator (RG) 12, a detector 14, and a switch 16. The RG 12 is operable to output a series of random numbers. It should be noted that the RG 12 generates random numbers in any conventional or unconventional manner, and that the random numbers may be represented as a series of binary bits.

The detector 14 detects the random numbers outputted by the RG 12 for its randomness according to predetermined criteria (explained later), and if it passes, the switch 16 allows the generated random numbers for a subsequent application, such as any circuit, system, process, gambling application, simulation, statistical sampling, Diffie-Hellman key exchanges, or the like which uses the random numbers supplied by the RG 12. For example, the switch 16 may represent an input to a cryptography system, an audio or video noise generator, a computer program, or other devices and processes. Thus, the switch 16 is deactivated, under the control of the detector 14, to stop the transmission of the generated random numbers when the generated random numbers are deemed insufficiently random.

Now, a description will be made in detail in regards to testing the statistical quality of the random sequence with reference to FIGS. 2 and 3.

Figure 2:
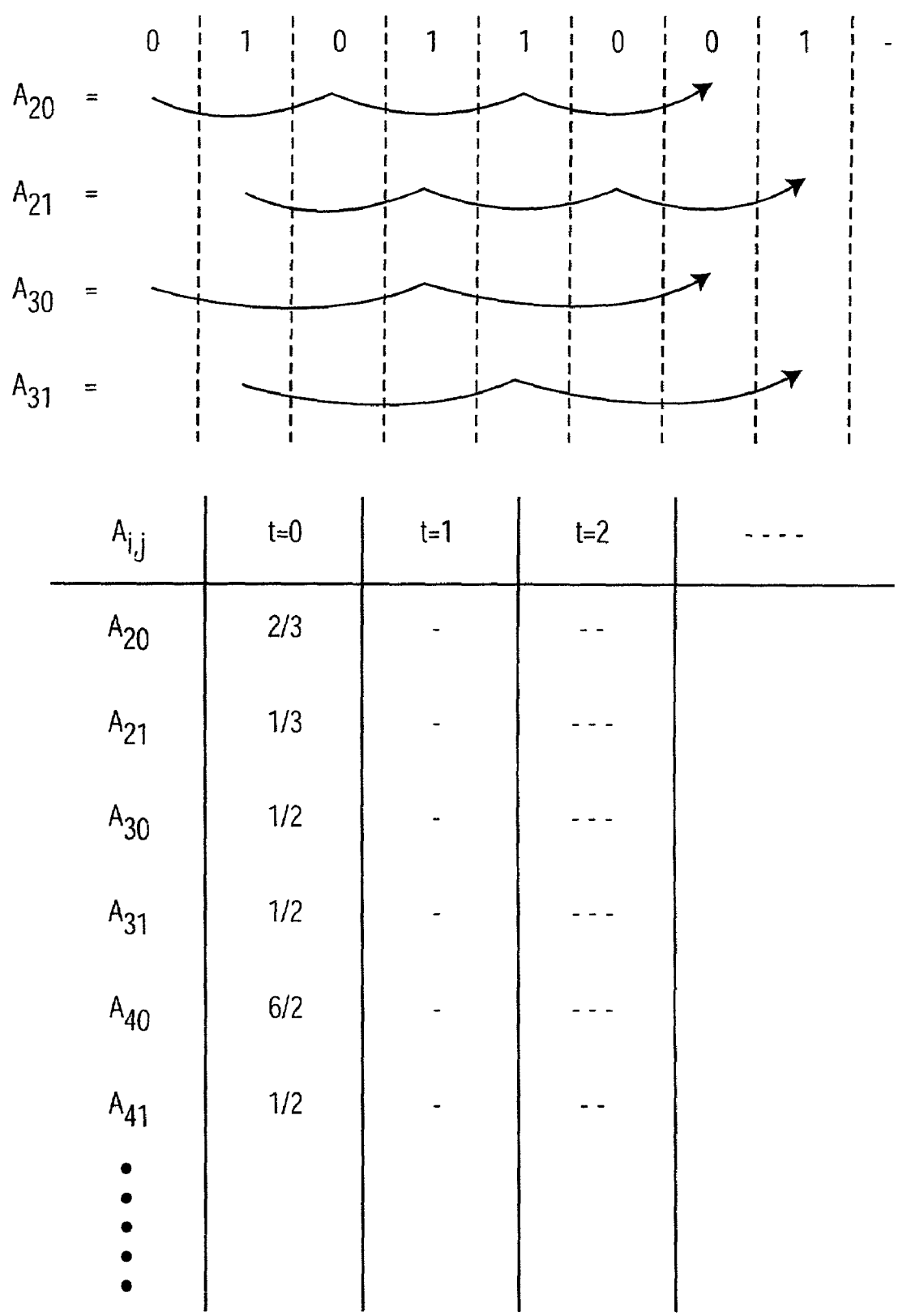
FIG. 2 shows a diagram showing the randomness test performed on a sequence of random numbers according to an embodiment of the present invention; and, FIG. 3 is a flow chart illustrating the operation steps of testing the statistics of the generated random numbers according to an embodiment of the present invention.

Referring to FIG. 2, the random numbers are tested in real time while the RG 12 is in operation to ensure that the generated random numbers are sufficiently random according to an embodiment of the present invention. Those skilled in the art will appreciate that a random number generator is considered secure if, given one or more random numbers, any other bit of the random sequence would be impossible to predict with more than 50% probability. As such, a key principle of the present invention involves testing the RG 12 given one or more random numbers to ensure that the generated random number pattern will be sufficiently random.

As shown in FIG. 2, a continuous stream of random values generated by the RG 12 undergoes an exponential averaging operation, in which the average frequency of either binary 0's or 1's occurring at different sets of subsequences is obtained, then compared to their respective predetermined acceptance range. If the calculated exponential average at a particular time for each average accumulator falls within the predetermined acceptance range for all subsequences, the samples are determined to be sufficiently random in accordance with the techniques of the present invention.

The randomness test as described above begins by initializing the exponential average accumulators, $A_{ij}$. An initial value is assigned to each accumulator. The index i represents an interval skip count, and the index j represents the start position of the counting, which is between 0 and i−1. As shown in FIG. 2, the average number of occurrences for 0's at a different combination of interval subsequences is updated. For example, for the random sequence (0, 1, 0, 1, 1, 0, 0, 1), the frequency of 0's appearing in the accumulator $A_{2,0}$ is 2 out of 3. The frequency of 0's appearing in the accumulator $A_{2,1}$ is 1 out of 3. The frequency of 0's appearing in the accumulator $A_{3,0}$ is 1 out of 2, and so forth. In this matter, the number of occurrences for each binary value of either 0 or 1 is counted. Thus, as each random number is generated, the frequency of 0 occurrences at different combinations of subsequences is obtained and updated. It should be noted that the counting of the binary bit of 0 is for illustrative purposes; however, it is to be understood that the counting can be done of the binary bit of 1.

In the embodiment, each time the corresponding binary frequency count is computed in each accumulator A, the old, average bits-counting value will have a diminishing effect. That is, the test to evaluate the statistical quality of the random sequence runs continuously, thus the counters must be cleared periodically. There are various counting methods that can be implemented in accordance with the techniques of the present invention; however, an exponential averaging is preferably used during the overlapping counting operation, as described below.

Each time a bit b is read, a factor, $\alpha$, which falls between 0 and 1 ($0<\alpha<1$), is multiplied to the A and then added to the new bit: $A_{new}=\alpha \cdot A_{old}+b$. To have useful averaging effects, the value for $\alpha$ is selected to be close to 1, $\alpha=1-1/n$, $n \gg 1$. In this case, log $\alpha−1/n$ and the half-life of the averaged bit is $k \approx n \cdot \log 2 \approx 0.30103 \cdot n$. After n bits the weight of the oldest bit becomes $(1-1/n)^n \approx 1/e \approx 0.367879$. Here, e is the basis of the natural logarithm (the Euler constant), so the term, n, becomes the natural life of a bit. If all bits were 1's, the accumulator value is $1+\alpha+\alpha^2+ \ldots =1/(1-\alpha)=n$, whereas if all bits were 0's the accumulator value is 0. Note that the expected value of the exponential average is the exponential average of the expected values of the individual bits: $\frac{1}{2}+\frac{1}{2}\alpha+\frac{1}{2}\alpha^2+ \ldots =n/2$. If every other bit was 1, the accumulator value alternates between $1+\alpha^2+\alpha^4+ \ldots =1/(1-\alpha^2)$ and $\alpha+\alpha^3+\alpha^5+ \ldots =\alpha/(1-\alpha^2)$, which are very close to ½ apart [n/(2n−1)], whose mean value is also $(1+\alpha)/2(1-\alpha)=n/2$.

As described above, the exponential averaging serves to clear the counter as the accumulator is decreased with a certain $0<\alpha<1$ factor; thus, the accumulator never becomes too large during the operation mode. Once the exponential averaging is performed for each accumulator, the value of exponential averaging is compared to a predetermined acceptance range. In the embodiment, it is determined whether the generated random number pattern will be unpredictable by comparing the value of each accumulator to the predetermined acceptance range value. If the value of any accumulator falls out of the predetermined range value during counting, it is inferred that the generated random numbers would be predictable.

The simplest property one wants to test of a random sequence is that the number of 0 and 1 bits is roughly the same. Here "roughly" means that, taking n samples, the sum of the bits is within the range of $[n/2-c \cdot \sqrt{n}, n/2+c \cdot \sqrt{n}]$ Here, the constant c controls what percentage of all of the sequences must fall into the interval. The constant c controls what percentage of all of the sequences will fall into the interval (c/2=1 gives 68.3%, c/2=2 gives 95.4%, c/2=3 gives 99.7% etc.). The value of c and n are pre-selected by the operator or prefixed so that a good trade-off between the complexity and the strength of the test may be optimized. Accordingly, if we choose c=10, in the average only one of every 1.7 million random sequences will give a sum outside the above interval after performing n steps. If we loosen the test (i.e. choosing c=20 in the averaging test), significant non-randomness could remain undetected (i.e. small bias). Therefore, obtaining the predetermined range of [n/2−c·√n, n/2+c·√n] used for testing non-randomness is determined by extensive simulations with a good, known source of random numbers.

If the exponential averaging accumulator falls out of the predetermined range, it indicates that the sequence shows an irregular distribution of 0/1 bits. Then, an alarm may be transmitted to the user to notify that the sequence may not be random or susceptible to crypto-analysis by an unauthorized party. Alternatively, a threshold value may be set to notify the user when the test fails repeatedly. As such, the exponential averaging limits can be initiated using a set of random sequence to determine whether the generated random sequence falls between the acceptable range, which is controllably set by an operator, so that a determination can be made as to whether the generated random sequence is unpredictable to an unauthorized party. In addition, a further step of testing the randomness can be achieved based on the distribution of the calculated exponential averaging values over the predetermined acceptance range. That is, the exponential averaging values must fall evenly within the predetermined acceptance range. Each time the exponential averaging value is calculated, it is monitored as to what part of the acceptance range it falls under, for example, the left half or the right half of the acceptance range. If the frequency of falling in the left-half is very different from the right-half, then this parameter can be used as an indication that the generated random numbers will not be unpredictable.

Figure 3:
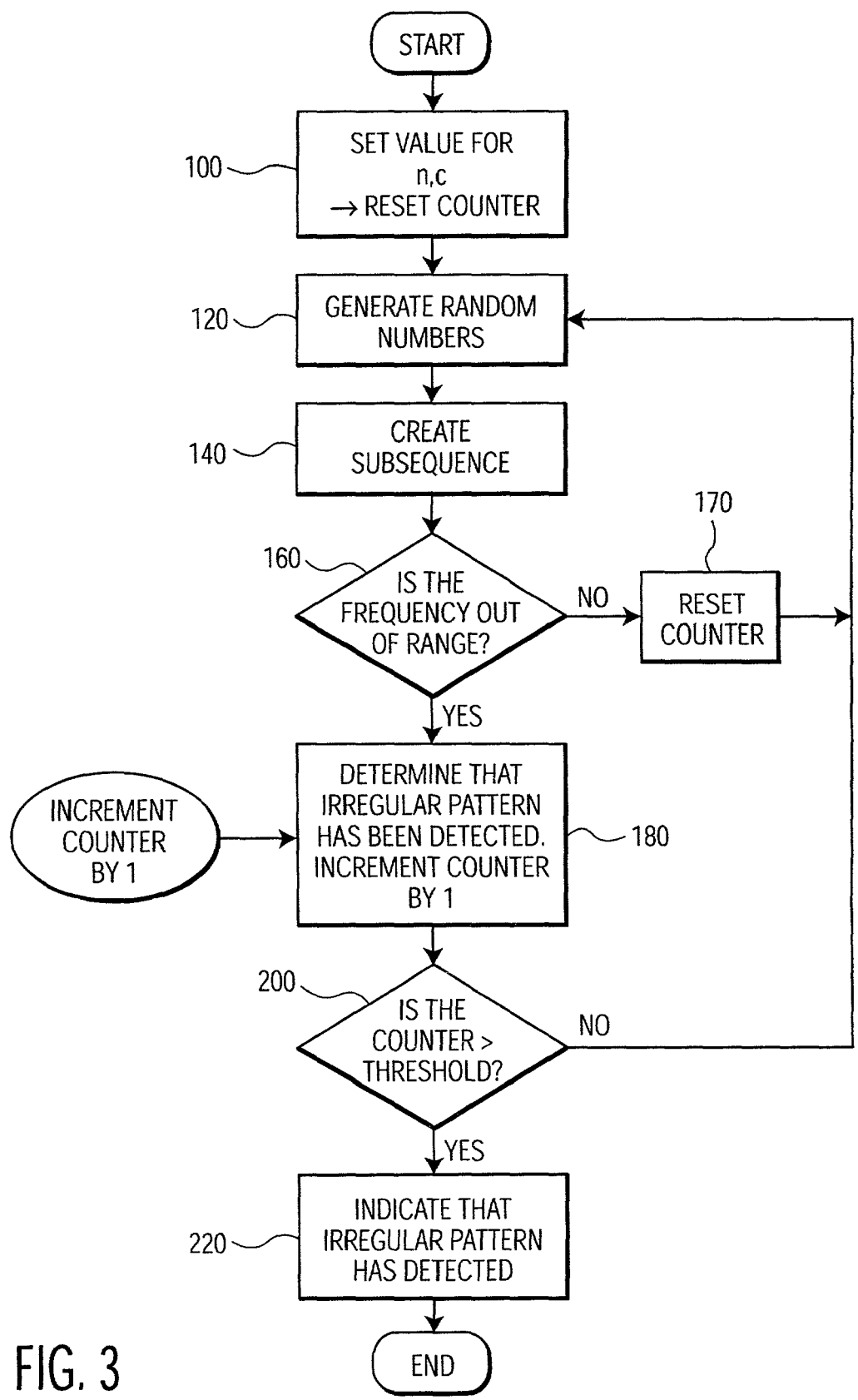

FIG. 3 is a flow chart illustrating the operation steps for testing the statistical quality of the random sequence in accordance with the present invention. The rectangular elements indicate computer software instruction, whereas the diamond-shaped element represents computer software instructions that affect the execution of the computer software instructions represented by the rectangular blocks. Alternatively, the processing and decision blocks represent steps performed by functionally equivalent circuits such as a digital signal processor circuit or an application-specific-integrated circuit (ASIC). It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Initially, the values for n and c for the predetermined acceptance range are prefixed or pre-selected by an operator in step 100. A series of random numbers is generated in step 120. As new random bits are generated, a set of sub-sequences, as shown in FIG. 2, is obtained in which the exponential average counting is performed in step 140. Then, the frequency count for each accumulator corresponding to a different combination of interval sub-sequences is compared to a predetermined acceptance range. If the frequency count is outside the predetermined acceptance range, it is determined that irregular patterns have been detected in step 180, and the counter is increased by 1. Otherwise, the step returns to step 120 of generating random numbers, and the counter is reset. In step 200, if the value of the counter is greater than a threshold value in step 200, a notice that the generated random numbers are non-random will be made in step 220 or the switch 16 is deactivated to stop the flow of the random numbers for a subsequent application. Alternatively, the generated random numbers can be discarded, and the whole process of generating new random numbers can be initiated. If the value of the counter does not exceed the threshold value, the step is returned to step 120.

The various steps described above may be implemented by programming them into functions incorporated within application programs, and programmers of ordinary skill in the field can implement them using customary programming techniques in languages, such as C, Visual Basic, Java, Perl, C++, and the like. In an exemplary embodiment, the method described in FIG. 3 may be constructed as follows (using the C programming language).

---

Appendix: MS Visual C code

```
/******************************************************************\
* BitAvg.c
*       OnchipTest <#random bits> <bit generator type> <bit generator param>
*       Generates test bits
*       Performs exponential averaging on bit sequences
*       Prints test statistics
* BitAvg 1e6 1 0000100110101111 ->
* Too large bias of bits 1,5,9, . . . 1449 = 27995
*
* vers. 1.0 04/11/01: Created by Laszlo Hars
*
\******************************************************************/
#include <stdio.h>
#include <stdlib.h>
#include <math.h>
#define NA      10
#define SA      6
#define NB      20
#define SB      20
// LO10 HI10    1.17    times (experimental) margin around the ideal exponential mean 1<<(NA−1+SA) = 32768
#define LO10    28000
```

-continued

Appendix: MS Visual C code

```
#define HI10            38340
#define LO20            548000000000ui64
#define HI20            551000000000ui64
#define MAX(A,B) ((A) > (B) ? (A) : (B))
#define MIN(A,B) ((A) < (B) ? (A) : (B))
typedef unsigned __int16 uint16;
typedef unsigned __int64 uint40;
// External function prototypes
void BitGenInit( int argc, char *argv[ ]);
unsigned int NextBit( );
int main (int argc, char *argv[ ])
{
        int i, bit, clk2 = 0, clk3 = 0, clk4 = 0, n = (int)atof(argv[1]);
        uint16 ax, a20, a21, a30, a31, a32, a40, a41, a42, a43,
                abit, axmax = LO10, axmin = HI10;
        uint40 bx, bbit, bxmax = LO20, bxmin = HI20;
        if( argc < 4 ) {
                printf("Usage: OnChipTest <#random bits> <bit generator type> <bit generator params . . . >\n";
                putchar('\a');          // rings the bell
                exit(1);        }
        BitGenInit(argc, argv);
        ax = 1    << (NA-1+SA);        // Initialize all average values with ideal past
        bx = 1ui64 <<(NB-1+SB);
        a20 = ax; a21 = ax;            // Initialize
        a30 = ax; a31 = ax; a32 = ax;
        a40 = ax; a41 = ax; a42 = ax; a43 = ax;
        for(i = 0; i < n; ++i) {
                bit = NextBit( );
                abit= bit << SA;
                bbit= bit << SB;
                ax -= (ax>>NA) - abit;
                axmax = MAX(ax,axmax); axmin = MIN(ax,axmin);
                if( ax < LO10 || ax > HI10 ) {
                        printf("Too large bias of bits 1,2,3, . . . %u = %u\n", i, ax);
                        exit(2); }
                bx -= (bx>>NB) - bbit;
                bxmax = MAX(bx,bxmax); bxmin = MIN(bx,bxmin);
                if( bx < LO20 || bx > HI20 ) {
                        printf("Too large long-bias of bits 1,2,3, . . . %u = %I64u\n", i, bx);
                        exit(2); }
                switch ( clk2 ) {
                    case 0 :
                        a20 -= (a20>>NA) - abit;
                        if( a20 < LO10 || a20 > HI10 ) {
                                printf("Too large bias of bits 0,2,4, . . . %u = %u\n", i, a20);
                                exit(2); }
                        break;
                    case 1 :
                        a21 -= (a21>>NA) - abit;
                        if( a21 < LO10 || a21 > HI10 ) {
                                printf("Too large bias of bits 1,3,5, . . . %u = %u\n", i, a21);
                                exit(2); }
                        break;
                }
                switch ( clk3 ) {
                    case 0 :
                        a30 -= (a30>>NA) - abit;
                        if( a30 < LO10 || a30 > HI10 ) {
                                printf("Too large bias of bits 0,3,6, . . . %u = %u\n", i, a30);
                                exit(2); }
                        break;
                    case 1 :
                        a31 -= (a31>>NA) -abit;
                        if( a31 < LO10 || a31 > HI10 ) {
                                printf("Too large bias of bits 1,4,7, . . . %u = %u\n", i, a31);
                                exit(2); }
                        break;
                    case 2 :
                        a32 -= (a32>>NA) - abit;
                        if( a32 < LO10 || a32 > HI10 ) {
                                printf("Too large bias of bits 2,5,8, . . . %u = %u\n", i, a32);
                                exit(2); }
                        break;
                }
                switch ( clk4 ) {
                    case 0 :
                        a40 -= (a40>>NA) - abit;
```

-continued

Appendix: MS Visual C code

```
            if( a40 < LO10 || a40 > HI10 ) {
                printf("Too large bias of bits 0,4,8, . . . %u = %u\n", i, a40);
                exit(2); }
            break;
        case 1 :
            a41 -= (a41>>NA) - abit;
            if( a41 < LO10 || a41 > HI10 ) {
                printf("Too large bias of bits 1,5,9, . . . %u = %u\n", i, a41);
                exit(2); }
            break;
        case 2 :
            a42 -= (a42>>NA) - abit;
            if( a42 < LO10 || a42 >HI10 ) {
                printf("Too large bias of bits 2,6,10, . . . %u = %u\n", i, a42);
                exit(2); }
            break;
        case 3 :
            a43 -= (a43>>NA) - abit;
            if( a43 < LO10 || a43 > HI10 ) {
                printf("Too large bias of bits 3,7,11, . . . %u = %u\n", i, a43);
                exit(2); }
            break;
        }
        clk2 = clk2 > 0 ? 0 : 1;        // count 0 1 0 1
        clk3 = clk3 > 1 ? 0 clk3 + 1;   // count 0 1 2 0 1 2
        clk4 = clk4 > 2 ? 0 clk4 + 1;   // count 0 1 2 3 0 1 2 3
    }
    printf("Short exponential min and max = %u %u\n", axmin, axmax);
    printf("Long exponential min and max = %I64u %I64u\n", bxmin, bxmax);
}
```

What is claimed is:

1. A method for evaluating a random number generator, the method comprising:

generating a stream of random numbers;

determining an average number of bits that have a value of a predetermined logic value at a predefined range of intervals using an exponential averaging operation (A);

determining whether the random number generator is providing random numbers that are sufficiently random by comparing an output of the exponential averaging operation to a predetermined acceptance range; and providing a notification that the random number generator is not properly providing random numbers when the output of the exponential averaging operation falls outside the predetermined acceptance range.

2. The method of claim 1, wherein the value of the predetermined logic value is one of 1 and 0.

3. The method of claim 1, including determining that the random number generator is not properly providing random numbers when the output of the exponential averaging operation falls outside the predetermined acceptance range.

4. The method of claim 1, including updating the exponential averaging operation each time a new bit is generated.

5. The method of claim 4, wherein the exponential averaging operation (A) is updated according to the following equation:

$$A_{new} = \alpha \cdot A_{old} + b,$$

wherein $\alpha = 1 - 1/n, n \gg 1$, wherein n represents a number of bits and wherein b is a value of 1 when the predetermined logic value is obtained, otherwise 0.

6. The method of claim 5, wherein the predetermined acceptance range is defined as follows:

$$[n/2 - c \cdot \sqrt{n},\ n/2 + c \cdot \sqrt{n}],$$

where c is selected to achieve a desired security threshold level.

7. The method of claim 1, including generating a new set of random, sequences when the output of the exponential averaging operation falls outside the predetermined acceptance range.

8. The method of claim 1, including determining whether to utilize a random number from the stream of random numbers in an encryption application in response to the determination of whether the random number generator is providing random numbers that are sufficiently random.

9. A method for evaluating a random number generator, the method comprising:

(a) generating a stream of random numbers of binary bits using the random number generator;

(b) determining an average number of bits that have a value of a predetermined logic value at a specific, predefined range of intervals using an exponential averaging operation (A);

(c) comparing an output of the exponential averaging operation to a predetermined acceptance range;

(d) determining that the random number generator is not generating random numbers that are sufficiently random when the output of the computed exponential averaging operation falls outside the predetermined acceptance range; and e) providing a notification that the random number generator is not properly operating when the output of the computed exponential averaging operation falls outside the predetermined acceptance range.

10. The method of claim 9, including repeating (a)-(d) until the output of the exponential averaging operation repeatedly falls outside the predetermined acceptance range more than a predefined number of times.

11. The method of claim 9, including generating a new set of random numbers when the output of the computed exponential averaging operation repeatedly falls outside the predetermined acceptance range more than a predefined number of times.

12. The method of claim 9, including updating the exponential averaging operation (A) according to the following equation:

$$A_{new} = \alpha \cdot A_{old} + b,$$

wherein $\alpha = 1 - 1/n$, $n \gg 1$, wherein n represents a number of bits and wherein b is a value of 1 when the predetermined logic value is obtained, otherwise 0.

13. The method of claim 12, wherein the predetermined acceptance range is defined as follows:

$$[n/2 - c \cdot \sqrt{n},\ n/2 + c \cdot \sqrt{n}],$$

where c is selected to achieve a desired security threshold level.

14. The method of claim 9, including determining whether to utilize a random number from the stream of random numbers in an encryption application in response to the determination of whether the random number generator is generating random numbers that are sufficiently random.

15. An apparatus, comprising:
a random generator unit for generating sequences of binary bits;
a detector unit, coupled to an output of the random generator unit, for detecting whether the generated random sequences are unpredictable; and,
a switching unit, coupled to the output of the random generator unit and an output of the detector unit, for disabling the flow of the sequences when the generated random sequences are determined to be predictable,
wherein the detector unit is configured to:
determine an average number of bits that have a value of a predetermined logic value at a specific, predefined range of intervals using an exponential averaging operation (A),
determine that the sequence is predictable if the output of the exponential averaging operation (A) falls outside a predetermined acceptance range; and
provide a notification that the random generator unit is not properly generating random sequences when the output of the exponential averaging operation falls outside the predetermined acceptance range.

16. The apparatus of claim 15, further comprising means for transmitting an alarm signal when the output of the exponential averaging operation falls outside the predetermined acceptance range.

17. The apparatus of claim 15, wherein the exponential averaging operation (A) is performed according to the following equation:

$$A_{new} = \alpha \cdot A_{old} + b,$$

wherein $\alpha = 1 - 1/n$, $n \gg 1$, wherein n represents a number of bits and wherein b is a value of 1 when the predetermined logic value is obtained, otherwise 0.

18. The apparatus of claim 17, wherein the predetermined acceptance range is defined as follows:

$$[n/2 - c \cdot \sqrt{n},\ n/2 + c \cdot \sqrt{n}],$$

where c is selected to achieve a desired security threshold level.

19. A machine-readable medium having stored thereon data representing sequences of instructions, and the sequences of instructions which when executed by a processor, cause the processor to:
generate a stream of random bits;
determine an average number of bits that have a value of a predetermined logic value at a specific, predefined range of intervals using an exponential averaging operation (A) on the number of bits indicative of the predetermined logic value;
compare an output of the exponential averaging operations to a predetermined acceptance range;
determine whether the generated stream of random bits is predictable in response to the comparison of the output of the exponential averaging operations to a predetermined acceptance range; and
provide a notification that the stream of random bits is not predictable when the computer exponential averaging operation fails outside the predetermined acceptance range.

20. The machine-readable medium of claim 19, wherein the exponential averaging operation (A) is performed according to the following equation:

$$A_{new} = \alpha \cdot A_{old} + b,$$

wherein $\alpha = 1 - 1/n$, $n \gg 1$, wherein n represents a number of bits and wherein b is a value of 1 when the predetermined logic value is obtained, otherwise 0.

21. The machine-readable medium of claim 20, wherein the predetermined acceptance range is defined as follows:

$$[n/2 - c \cdot \sqrt{n},\ n/2 + c \cdot \sqrt{n}],$$

where c is selected to achieve a desired security threshold level.

* * * * *